(12) United States Patent
Morton

(10) Patent No.: US 8,123,516 B1
(45) Date of Patent: Feb. 28, 2012

(54) INJECTION MOLDING MACHINE WITH MELT DISTRIBUTING PLATEN

(75) Inventor: Ray Horton Morton, New Braunfels, TX (US)

(73) Assignee: Flextronics AP, LLC, Broomfield, CO (US)

( * ) Notice: Subject to any disclaimer, the term of this patent is extended or adjusted under 35 U.S.C. 154(b) by 620 days.

(21) Appl. No.: 11/551,860

(22) Filed: Oct. 23, 2006

Related U.S. Application Data

(60) Provisional application No. 60/804,157, filed on Jun. 7, 2006.

(51) Int. Cl.
*B29C 45/00* (2006.01)

(52) U.S. Cl. ......... 425/574; 425/588; 425/589; 425/572

(58) Field of Classification Search .................. 425/574, 425/575, 576, DIG. 227, DIG. 228, 588, 425/589, 592, 593, 572
See application file for complete search history.

(56) References Cited

U.S. PATENT DOCUMENTS

| | | | | |
|---|---|---|---|---|
| 3,464,091 A | * | 9/1969 | Bielfeldt | 425/574 |
| 3,647,338 A | * | 3/1972 | Ise | 425/567 |
| 3,671,162 A | * | 6/1972 | Lohmann | 425/563 |
| 3,707,342 A | | 12/1972 | Lohmann | |
| 4,751,037 A | * | 6/1988 | Faneuf | 264/328.11 |
| 5,040,969 A | | 8/1991 | von Buren et al. | |
| 5,052,915 A | * | 10/1991 | Schad et al. | 425/556 |
| 5,145,353 A | | 9/1992 | Zakich | |
| 5,229,145 A | | 7/1993 | Brown et al. | |
| 5,407,342 A | * | 4/1995 | Boucher et al. | 425/145 |
| 5,620,723 A | | 4/1997 | Glaesener et al. | |
| 5,714,180 A | | 2/1998 | Lampl et al. | |
| 5,868,989 A | * | 2/1999 | Glaesener et al. | 264/328.1 |
| 5,908,597 A | | 6/1999 | Boudreau et al. | |
| 5,928,684 A | | 7/1999 | Glaesener et al. | |
| 2005/0287244 A1 | | 12/2005 | Glaesener | |
| 2006/0082032 A1 | | 4/2006 | DiSimone | |
| 2007/0212445 A1 | * | 9/2007 | Wimberger | 425/576 |

FOREIGN PATENT DOCUMENTS

WO   WO2006/056539 A1  *  6/2006

OTHER PUBLICATIONS

Mikell Knights, Close-Up Technology-Tooling Tandem Tools: New Twist on Stack Molds for Larger Parts, PTonline.com, 2006.

\* cited by examiner

*Primary Examiner* — Maria Veronica Ewald

(74) *Attorney, Agent, or Firm* — Russell T. Manning; Robert G. Crouch; Marsh Fischmann & Breyfogle LLP

(57) ABSTRACT

An injection molding machine is provided that allows the use of two conventional molds. The injection molding machine utilizes an injection material distributing platen having a first mold mounting surface and a second opposing mold mounting surface. A conventional mold may be mounted to each mold mounting surface. To provide injection material to the molds, an injection unit may provide injection material to an internal passageway within the distributing platen between the first and second mold mounting surfaces. The injection material may be selectively distributed to molds attached in the first and second mold mounting surfaces. To reduce the overall size of the machine, the injection unit may be a vertical injection unit that is disposed above the distributing platen.

9 Claims, 6 Drawing Sheets

INJECTION MOLDING MACHINE WITH MELT DISTRIBUTING PLATEN

CROSS REFERENCE TO RELATED APPLICATION

This application claims priority under 35 U.S.C. 119 to U.S. Provisional Application No. 60/804,157 entitled "Injection Molding Machine with Melt Distributing Platen" filed on Jun. 7, 2006, the contents of which are incorporated by reference herein.

FIELD

Presented herein are systems and processes (i.e., utilities) directed to the field of injection molding. More specifically, the utilities are provided that allow for increased productivity in an injection molding process.

BACKGROUND

Injection molding is a manufacturing technique for making parts from plastic and other materials where molten material (e.g., plastic, metal, ceramic, etc) is injected at high pressure into a mold that is the inverse of the desired shape. The mold is typically made by from metal, usually either steel or aluminum, and precision-machined to form the features of the desired part. Once the molten material cools within the mold, the mold is opened (e.g., first and second mold portions are separated along a mold parting line) and the molded part is removed.

Injection molding is widely used for manufacturing a variety of parts, from very small parts (e.g. cell phone cases, micro watch parts etc.) to large parts (e.g., body panels of cars). Injection molding is accomplished by injection molding machines that are operative to compress mold portions together and inject molten material into the compressed mold portions (i.e., that define a desired shape/part). Typically the mold is held together (i.e. closed) by a mechanical force. The clamping force necessary to maintain the mold portions together during the injection process is defined as the injection pressure multiplied by the total projected area of the mold. In cases where two or more molds are stacked, the necessary clamping force is defined by the injection pressure times the greater projected area of the two or more aligned molds.

In order to provide molten material to the mold, injection materials, typically in the form of granular pellets, powders, strips, and in some instances liquids, are fed to the machine through a feed throat. In one arrangement, the injection materials enter an injection barrel by gravity though the feed throat. Upon entrance into the barrel, the material is heated to an appropriate temperature.

Typically melted material (i.e., melt) is injected into the mold by a positive or semi positive linear device such as a reciprocating screw or a ram injector (e.g., a hydraulic injector). In a system utilizing a reciprocating screw, the injection material (e.g., pellets, powder, strips, liquid etc.) moves forward as the screw rotates and undergoes extreme pressure, heat and friction that generates most of the heat needed to melt or the injection material. Heaters surrounding the screw may also assist in the heating and temperature control of the injection material during the process.

The mold is the part of the machine that receives the injection material and shapes it appropriately. The mold is controlled constantly to a temperature that allows the material to solidify sometimes at a reduced temperature. Fluid-cooling channels and cooling fluid may assist in cooling the material. The cycle is completed when the mold is opened and the part is ejected (sometimes with the assistance of ejector pins within the mold).

The number of parts that may be produced by an injection molding machine is dependent on the cycle time of the process. The cycle time is determined by the time required to inject the molten injection material into the mold, solidify the injection material, open the mold, eject the part(s) and close the mold. It will be appreciated that a single mold may include a plurality of cavities to permit, for example the molding of a plurality of identical parts. In this regard, a single set of parts may be generated during each cycle. To increase the productivity of an injection molding machine, stacked molds may be utilized. Such stacked molds generally are formed having two or more parting lines defining separate sets of mold cavities. These separate sets of mold cavities that often have aligned projection areas such that both sets of molds may be filled without an increase in the clamping force. Such stacked parting line molds allow for two or more sets of parts to be manufactured during a single cycle.

One drawback to the use of stacked parting line molds is that the molds must be specially designed to allow for transfer of injection material from the first mold defined by a first parting line to a subsequent mold. For instance, heated runners (i.e., feed channels) may be required to allow for such transfer between molds. Such specialized molds require added expertise in design and manufacture, require additional space in an injection machine and increase the cost and lead time to procure the molds.

SUMMARY

It has been recognized that it would be desirable to produce an injection molding system that is operative to generate multiple sets of parts during a single cycle while having the ability to utilize standard (i.e., conventional) molds in addition to specialized molds (e.g., stacked molds). That is, it may be desirable in some instances to produce multiple sets of parts utilizing molds that are not stack molds or specially designed for use in series. Further, it has been recognized it would be desirable to modify existing injection molding systems to allow for use of multiple molds. Accordingly, the production capacity of existing production facilities may be increases without increasing the size of the facility.

To allow the use of multiple molds, including multiple conventional molds, during a single cycle, it has been determined that such molds may be mounted to opposing faces of a platen. In this regard, a single platen may have a first mold mounting surface and a second opposing mold mounting surface. Such surfaces may be disposed on opposing sides of the platen and may be substantially parallel. Accordingly, a mold half may be attached to each mold mounting surface of the platen. Accordingly, corresponding mold halves may be disposed against the mold halves on the platen, and an appropriate clamping force may be applied thereto such that the injection material may be injected into the molds. In this regard, the platen having opposing mounting surfaces for holding two sets of mold halves may be termed a center platen. Such a center platen may be disposed between two platens that are operative to hold corresponding mold halves.

Injection material may be provided from the center platen to the first and second molds. In order to distribute injection material to the first and second molds, the center platen may include or hold an internal passageway for receiving injection material from an injection unit, which may supply molten injection material at a predetermined pressure. Accordingly, the internal passageway may be disposed between the first and second mold mounting surfaces and have a passageway that leads to the first mold mounting surface and the second mold mounting surface and, hence, the first and second molds. It will be appreciated that such passages leading to the first and second mold mounting surfaces may include valves or gates to allow for selective injection of injection material into the first and second molds.

In one arrangement, the center platen is a stationary platen that is disposed between first and second movable platens. Accordingly, the first and second movable platens may each have a mold mounting surface that is operative to more toward and away from the first and second mounting surfaces, respectively, of the stationary center platen. The apparatus may further include an injection unit that is disposed above a stationary center platen. This injection unit may be adapted to inject injection material into the internal passageway of the center platen (i.e., for disposition to the first and second mold mounting surfaces). The mold mounting surfaces of the center platen define generally vertical surfaces, and the movement direction of the movable platens defines a horizontal reference axis. In such an arrangement, the longitudinal axis of the injection unit (e.g., the ram and/or screw) may be substantially aligned with the vertical reference planes and/or substantially perpendicular to the horizontal reference axis. As will be appreciated, utilization of such a vertically aligned injection unit disposed above a stationary platen may allow for reducing the overall length of the injection molding apparatus.

The injection molding apparatus may utilize a clamp that is operative to move the first and second movable platens relative to the stationary platen as well as apply a clamping force during the injection molding process. In one arrangement, a single clamp is operative to move both platens. In another arrangement, each platen utilizes a separate clamping apparatus for movement and/or compression purposes.

The movable platens may move along tie bars that extend substantially perpendicular to the mold mounting surfaces of the center platen. Further, such tie bars may extend through a portion of the center platen and/or be movable through a portion of the center platen. In one arrangement, the one of the movable platens may be fixedly connected to the tie bars. In such an arrangement, the tie bars and the fixedly connected platen may be operative to move relative to the stationary platen.

According to another arrangement, the center platen is operative to move relative to one or more stationary platens. In such an arrangement, a center platen may be disposed between a first movable platen and a stationary platen. In this regard, the first movable platen and the center platen may be operative to move toward and away from the stationary platen. In this regard, movement of the center platen towards the stationary platen may be operative to open/close a first mold while movement of the first movable platen relative to the center platen that may be operative to open/close a second mold. The movement of the center platen and first movable platen may be simultaneous or sequential. Again, the center platen may include internal passageways that are disposed between first and second opposing mold mounting surfaces such that injection material may be delivered to the opposing mold mounting surfaces. The apparatus also includes an injection unit having nozzle that is operative to engage and disengage the internal passageway of the center platen. That is, the injection unit may have a movable nozzle that is operative to engage the internal passageway when the movable center platen is in a closed position relative to the stationary platen. Likewise, the movable nozzle of the injection unit may be operative to disengage the movable center platen such that the center platen may move to an open position relative to the stationary platen (e.g., to eject one or more parts). In one arrangement, the injection unit may be disposed above the platens to reduce the footprint of the system.

Various methods may be utilized with the arrangements discussed above. For instance, a first mold may be compressed between the center platen and first platen and a second mold may be compressed between the center platen and a second platen. Such compression may be effected through the movement of one or both of the first and second platens. That is, one of the first and second platens and the center platen may be a stationary platen. In any case, once the first and second molds are compressed between the various platens, injection material may be injected into an internal passageway of the center platen. This injection material may be provided to the first and second molds from the center platen.

In one arrangement, the injection material may be simultaneously distributed to the first and second molds. In another arrangement, injection material may be provided to the first mold at a first time and to the second mold at a second time. This may entail the sequential opening and closing a various control valves or gates to selectively provide injection material to the molds.

Injecting material into the center platen may entail engaging a nozzle of an injection unit into an inlet of the center platen. For instance, if the center platen is a movable platen, the center platen maybe move from a mold open position where the nozzle of the injection unit is disengaged to a mold closed position where the nozzle may be engaged with the center platen to provide injection material. In one arrangement, a displacement mechanism of the injection unit (e.g., a reciprocating screw or ram) may be operative to move in a direction is substantially parallel with the mold mounting surfaces of the center platen. In a further arrangement this displacement mechanism may be disposed between the mold mounting surfaces of the center platen. In this regard, the injection unit may be disposed above the center platen and may provide injection material directly into an internal passageway of the center platen. Such direct injection may reduce the distance injection material travels between the injection unit and the molds as well as reduce the number of bends or turns in any interconnecting passageways.

DESCRIPTION

Reference will now be made to the accompanying drawings, which assist in illustrating the various pertinent features of the present invention. In this regard, the following description is presented for purposes of illustration and description. Furthermore, the description is not intended to limit the embodiments to the forms disclosed herein. Consequently, variations in modifications consistent with the following teachings, and skill and knowledge of the relevant art, are within the scope of the present application.

Figure 1:
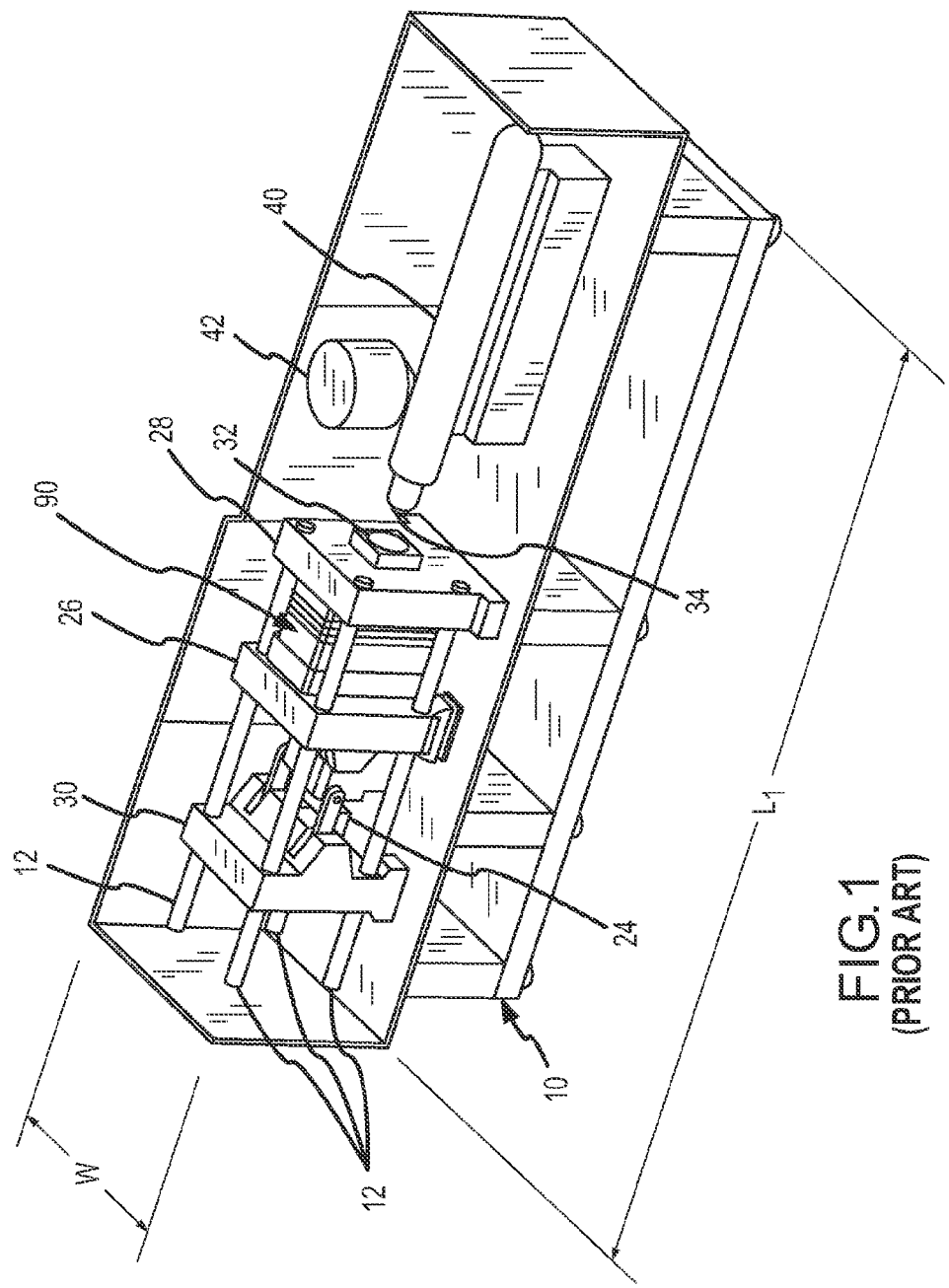
FIG. 1 illustrates an injection molding machine utilizing a single conventional mold.

FIG. 1 illustrates a single part injection molding machine 20. As shown, the molding machine 20 includes a clamping arrangement 24 that is adapted to apply pressure (force) between mold halves of a part mold 90 disposed within the machine. In this regard, mold halves may be mounted to a movable 26 and a stationary platen 28 that are designed to hold mold halves and compress those halves together. Accordingly, the clamping arrangement 24 is adapted to apply an expansive force between a rear platen 30 and the movable platen 26. The clamping arrangement 24 may include any appropriate mechanical assembly such as, for example, hydraulic cylinders and/or mechanical linkages. The platens are interconnected by a plurality of tie/strain bars 12. In such an arrangement, the clamping arrangement 24 is operative to move the movable platen 26 along the tie/strain bars 12, which extend between the rear platen 30 and the stationary platen 28. In this arrangement, the rear platen 30 is also stationary. The clamping arrangement 24 is operative to compress the mold halves between the movable platen 26 and the stationary platen 28.

The stationary platen 28 includes an insert 32 for receiving material from a nozzle 34 of an injection unit 40. The insert 32 connects to a flow channel that extends through the stationary platen 28. This flow channel is aligned with a runner within the mold 90 that extends into a cavity defined by the mating halves of the mold 90.

The injection unit 40 may be a hydraulic/electric or a screw type injector and includes a feed throat and hopper 42 in which material, for example pellets, may be supplied. As noted above, injection unit 40 handles the material received from the feed throat and hopper and forces the material into the mold 90. That is, during each cycle, injection unit 40 provides a 'shot' of injection material that fills the internal cavity of the mold 90 compressed between the movable platen 26 and the stationary platen 28. As shown in FIG. 1, the injection unit is horizontally disposed. Stated otherwise, the longitudinal axis of the internal screw or ram (not shown) of the injection unit 40 is aligned with the movement path of the movable platen 26. In this regard, the injection unit 40 is disposed substantially perpendicular to the mold mounting surfaces of the platens 26, 28. As shown, the molding machine of FIG. 1 holds only a single conventional mold 90. Accordingly, only a single set of parts may be produced per injection cycle. In the present embodiment, the overall length L1 of the molding machine is a combination of the length of the clamping arrangement 24 and mold mounting platens 26, 28 and the horizontally mounted injection unit 40.

Figure 2:
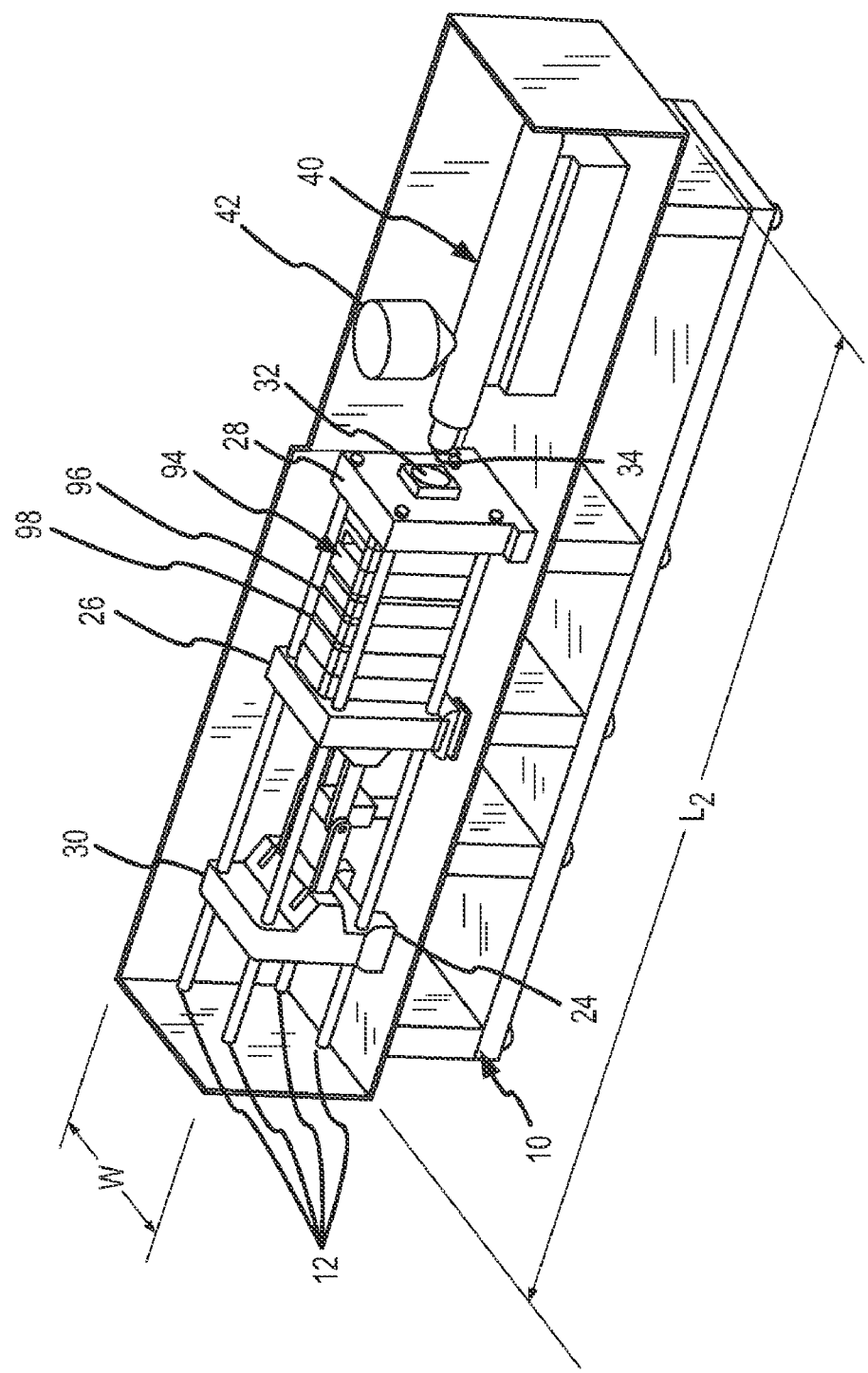
FIG. 2 illustrates an injection molding machine utilizing a stacked mold having multiple parting lines.

FIG. 2 illustrates a second embodiment of a molding machine 20 that includes a stack tooling or stack mold arrangement. The stack mold 94 includes multiple cavities that are defined by two or more parting lines 96, 98. Generally, the cavities of the stack mold 94 are aligned one on top of another. Accordingly, to permit injection material transfer between the interior cavities of the stack mold 94, the stack mold 94 must include interior runners, which are typically heated to allow the molten injection material to flow therethrough. In this regard, injection material may be received through an internal passageway of the stationary platen 28 pass into a first mold cavity defined by the first parting line 96 and then pass to a second mold cavity as defined by parting line 98. In this regard, the molding machine of FIG. 2 allows for producing multiple sets of parts. However, the machine requires specialized tooling/molds. Further, to allow for use of a stack mold, the overall length L2 of the molding machine of FIG. 2 may be longer than that of a molding machine operative to utilize a single mold single mold (i.e., L2>L1).

Figure 3:
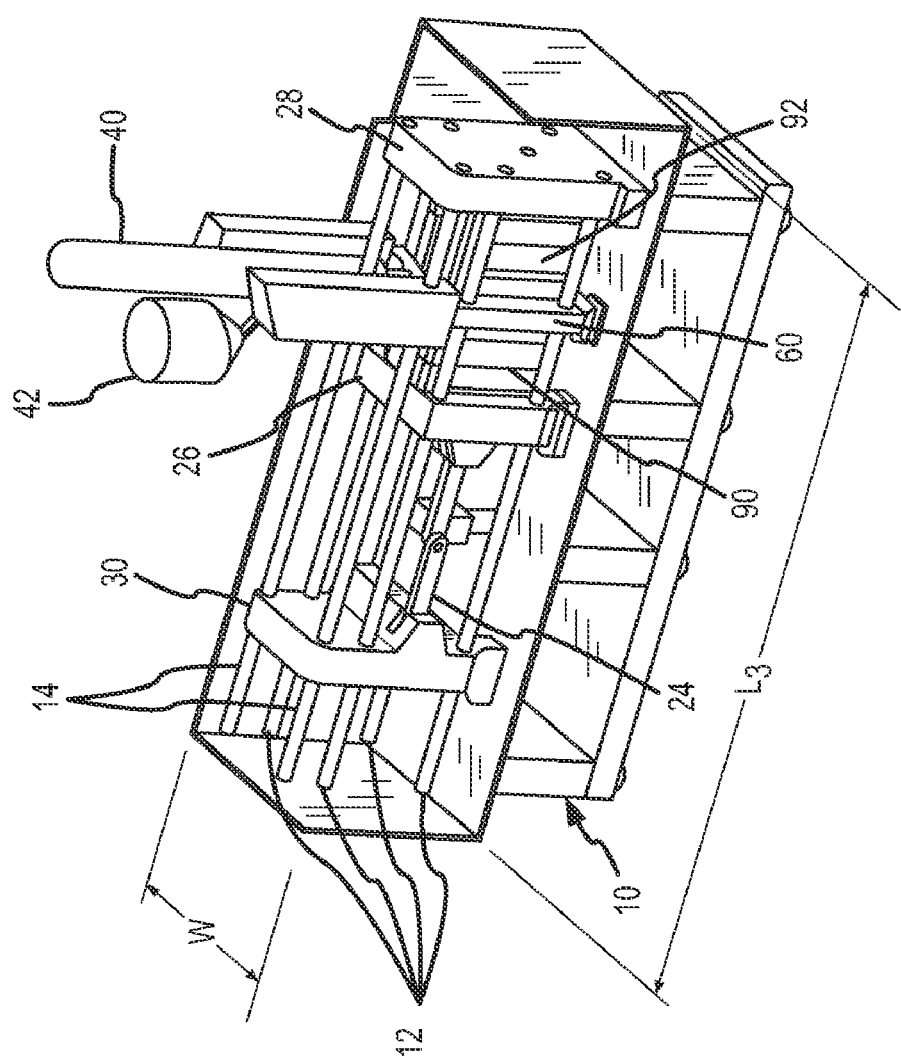
FIG. 3 illustrates one embodiment of an injection molding machine utilizing a center platen that distributes injection material.

FIG. 3 illustrates one embodiment of a molding machine 50 that is operative to produce multiple sets of parts while reducing the overall size of the machine 50 and while permitting the use of conventional molds. Common components of the molding machine 50 and the above noted molding machines 20 utilize common reference numbers. As shown, the molding machine 50 utilizes an additional platen 60. The additional platen 60 is disposed between the movable platen 26 in the stationary platen 28. In this regard, the additional platen 60 may be termed a center platen 60, as it is disposed between at least two other platens. The center platen 60 includes a first mold mounting surface and a second mold mounting surface. Accordingly, a first conventional mold 90 may be mounted between the stationary platen 28 and the center platen 60 and a second conventional mold 92 may be mounted between the movable platen 26 and the center platen 60. As shown, the movable platen 26 and the center platen 60 are operative to move along the tie/strain bars 12. That is, the clamping arrangement 24 is operative to provide an expansive force between the rear platen 30 in the movable platen 26. This expansive force is translated from the movable platen 26 towards the stationary platen 28. In this regard, the clamping arrangement 24 is operative to compress the center platen 60 between the movable platen 26 and stationary platen 28. Accordingly, mold halves 90a, 90b mounted between the movable platen 26 and the center platen 60 and mold halves 92a, 92b mounted between the center platen 60 and the stationary platen 28 may be compressed together. Accordingly, when the mold halves are closed with a desired compressive force, injection material may be injected into the molds 90, 92.

In order to provide molten injection material to each of the molds 90, 92, the center platen 60 is interconnected to an injection unit 40. In the present arrangement, the injection unit 40 is a vertical injection unit 40 that is disposed above the center platen 60. Further, in the present embodiment the injection unit 40 is operative to selectively engage and disengage its output nozzle with an inlet of the center platen 60. Such selective engagement and disengagement allows the center platen 60 to move between cycles. That is, when the center platen 60 is compressed against the stationary platen 28 and the molds 90, 92 are closed, the output nozzle of the vertical injection unit 40 may be engaged with the inlet of the center platen 60 to provide injection material thereto. Accordingly, after the injection material has been provided to the center platen 60 and distributed to the first and second molds 90, 92, as will be more fully discussed herein, the injection nozzle may be retracted relative to the center platen 60. Accordingly, the center platen 60 may be moved away from the stationary platen 28 and/or the movable platen 26 may be moved away from the center platen 60 in order to separate the mold halves 90a, 90b, and 92a, 92b along their respective part lines. This permits the release/ejection of parts from the molds 90, 92.

As illustrated, the injection unit 40 is mounted above the movable platen 26 and center platen 60 and between the stationary platen 28 and rear platen 30. In the illustrated embodiment, a second set of tie bars 14 extend between the rear platen 30 and the stationary platen 28. The injection unit 40 is mounted to the second set of tie/strain bars 14. While being fixedly position relative to the center platen 60 during the injection process, the position of the injection unit 40 may be adjusted along the length of the tie/strain bars 14 between the rear platen 30 and the stationary platen 28. In this regard, the position of the injection unit 40 may be adjusted to allow for use of the system 50 with differently sized molds. It will be appreciated that other arrangements for permitting the selective positioning of a vertical injection unit relative one or more platens of a injection molding system are envisioned and are within the scope of the present disclosure.

Figure 4:
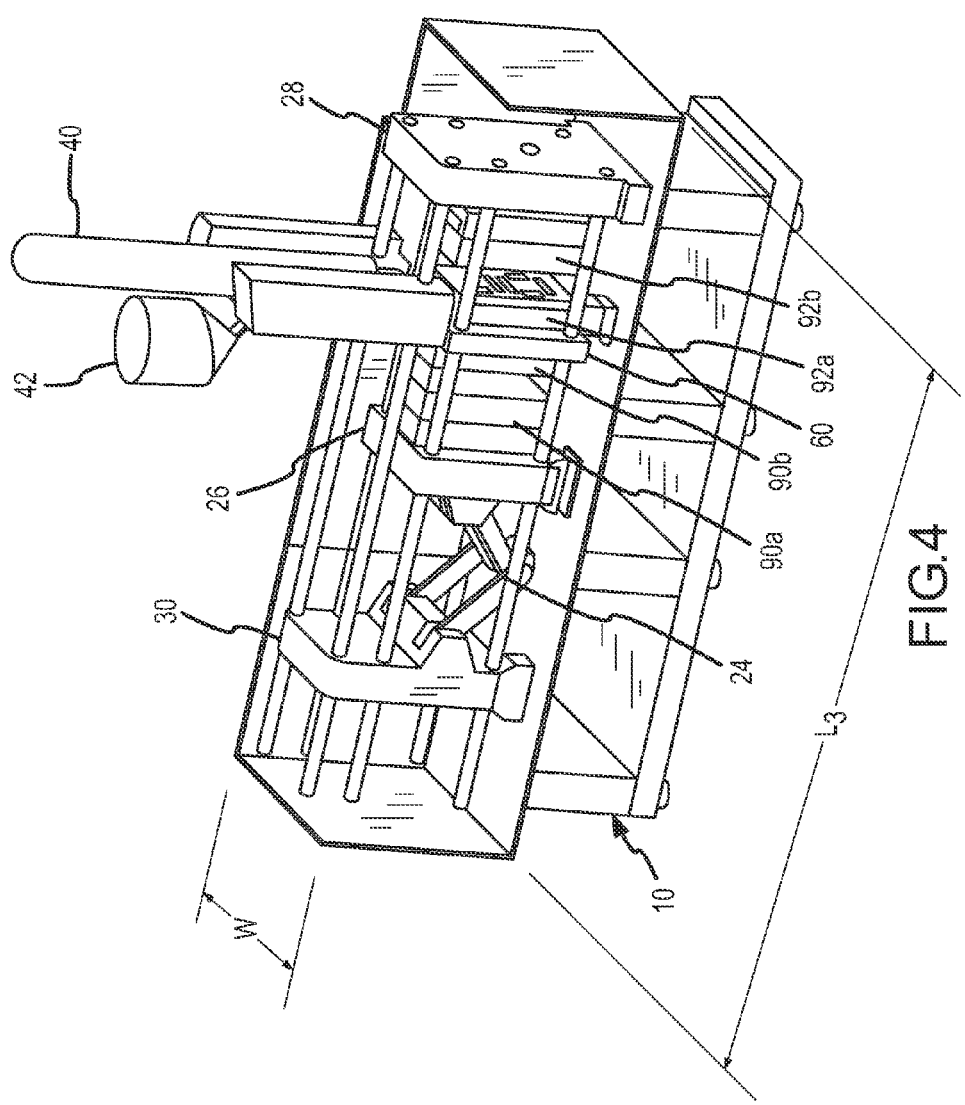
FIG. 4 illustrates injection molding machine of FIG. 3 in an open configuration.

FIG. 4 illustrates movement of the center platen 60 for the purpose of releasing parts from the first and second molds 90, 92. As shown, the clamping arrangement 24 releases the compressive force between the movable platens 26 and the rear platen 30.

Further, the movable platen 26 is moved towards the rear platen 30 and away from the center platen 60. In conjunction with this movement, the center platen 60 is moved away from the stationary platen 28. Various different linkages and/or motors may be utilized to effectuate such movement. In any case, such movement is performed after the parts within the molds 90, 92 have solidified. The movement of the platens 26, 60 relative to one another allows for opening the first and second molds 90, 92 along their part lines. Once the molds 90, 92 are opened, ejectors associated with the platens 26 and 28 (or molds 90 and 92) may be utilized to eject the solidified parts from the molds 90, 92.

Figure 5:
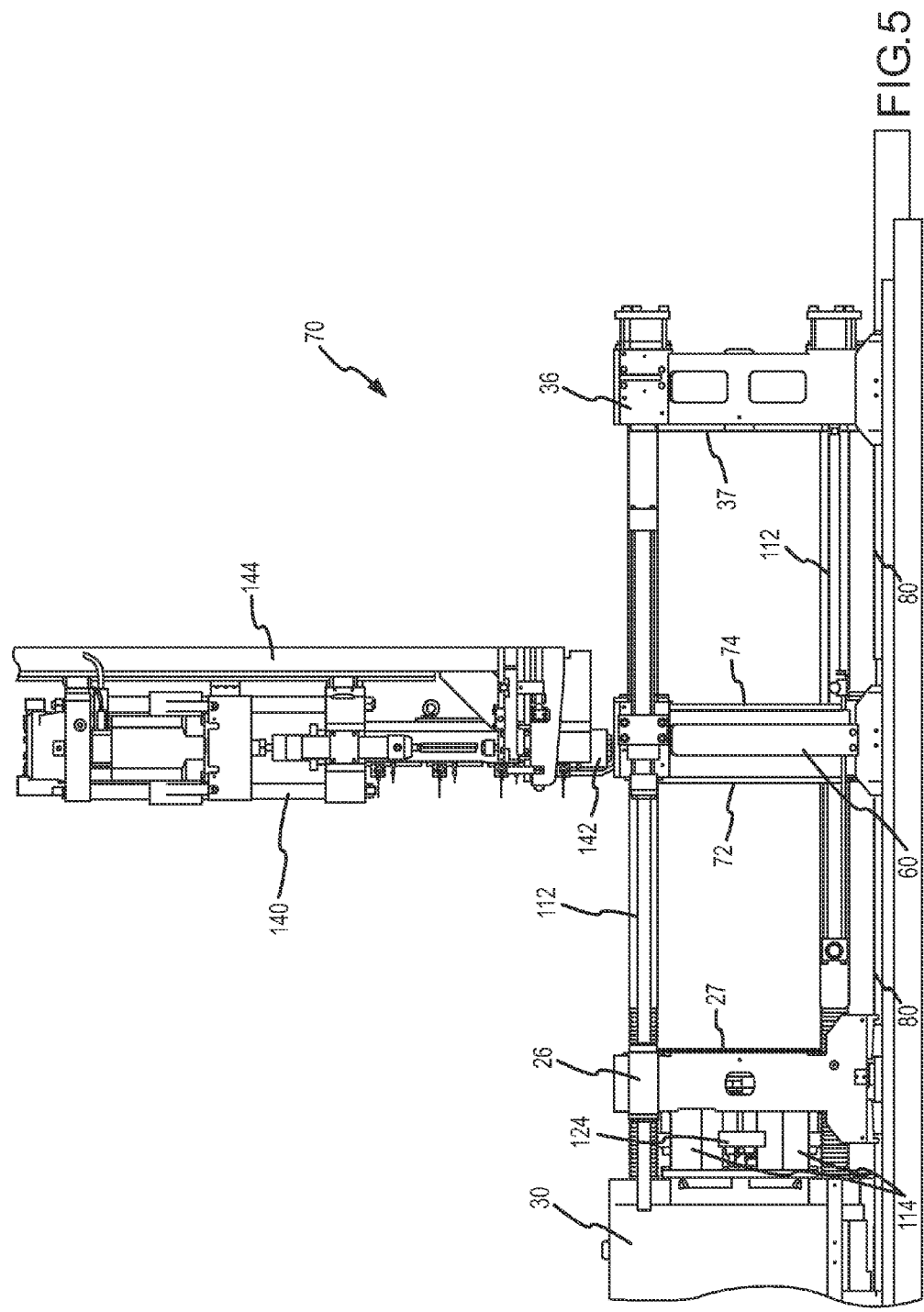
FIG. 5 illustrates another embodiment of injection molding machine utilizing a center platen that distributes injection material.

FIG. 5 illustrates another embodiment of a molding machine 70 that utilizes a center platen 60 having first and second opposing mold mounting surfaces 72, 74. In the embodiment of FIG. 5, the center platen 60 is a stationary platen. In this regard, the system 70 utilizes first and second moving platens 26, 36 that are operative to move toward and away from the opposing mold mounting surfaces 72, 74 of the center platen 60. That is, the first movable platen 26 includes a mold mounting surface 27 that may be disposed towards the corresponding mold mounting surface 72 of the center platen 60. Likewise, the second movable platen 36 includes a mold mounting surface 37 that may be disposed towards the opposing mold mounting surface 74 of the center platen 60. The first movable platen 26 also includes an ejector 124 that is adapted to eject a part from a mold connected to the mould mounting surface 27 of the first movable platen 26. The second platen 36 may also incorporate one or more ejectors (not shown). In any case, first and second molds or first and second sets of stack molds may be disposed between the respective mold mounting surfaces.

Again, a clamping arrangement is operative to displace the moveable platens 26, 36 toward and away from the center platen 60. In the embodiment shown, a single clamping arrangement is operative to move both movable platens 26, 36 relative to the center platen 60. In the present embodiment, the clamping arrangement (not shown) is disposed within the rear platen 30. The clamping arrangement is operative to displace one movable platen 26 toward/away from the center platen 60 using a first pair of linear actuators 114 and displaces the other movable platen 36 toward/away from the center platen 60 using a second pair of linear actuators 112. In this regard, the second movable platen 36 maybe fixedly interconnected to linear actuators 112. Accordingly, when the second movable platen 36 is displaced, the platen 36 maybe pulled toward the center platen 60 utilizing the linear actuators 112. In this regard, the linear actuators 112 may pass through the center platen 60. In other embodiments the linear actuators may pass by the center platen 60. Further, the bottom surfaces of the first and second movable platens 26, 36 may move along tracks 80. These tracks 80 may be mounted to a base 82 of the system 70 and may support the weight of the platens 26, 36 while permitting the platens 26, 36 to be displaced relative to the center platen 60. The base 82 may directly support the center platen 60.

The system 70 of FIG. 5 also utilizes a vertical injection unit 140. The nozzle 142 of the injection unit 140 may be fixedly position relative to a top surface of the center platen 60. That is, the nozzle 142 may be disposed within an inlet to an internal passageway within the center platen 60 that is operative to distribute injection material to the first and second mold mounting surfaces 72, 74. In one arrangement, the center platen 60 may support the injection unit 140. In other arrangements, external supports 144 may be utilized to maintain the injection unit 140 above the center platen 60. As shown, the longitudinal axis of the injection unit, which is aligned with the reciprocating screw or ram of the injection unit 140, is disposed between the first and second mounting surfaces 72, 74 of the center platen. In this regard, it will be appreciated that the vertical injection unit is operative to inject injection material directly into the center platen 60 free of any bends or turns in a fluid flow path between the injection unit 140 and the center platen 60.

Of note, in the embodiments of FIGS. 3-5, use of the vertical injection unit 140 allows for reducing the footprint (i.e. floor space) of the machine 60. For instance, the embodiments of the machines 50, 70 may have similar or identical part making capabilities (e.g., compressive force) as the machines 20 of FIGS. 1 and 2. However, the machines 50, 70 utilizing a vertical injection unit 140 may be considerably smaller than injection machines and utilize a horizontal injection unit 40. For instance, the machines 50, 70 of FIGS. 3 and 5 may utilize conventional molds and may be considerably shorter than a comparably sized (i.e., production capacity) stack mold machine (i.e., L3<L2) that utilizes specialized molds and a horizontal or in-line injection unit. Further, the machines 50, 70 of FIGS. 3 and 5 may be smaller than the molding machine 20 of FIG. 1 (i.e., L3<L1), which utilizes a single conventional mold. Further, these machines 50, 70 may utilize multiple conventional molds and thereby permit producing a multiple (e.g., twice) of the amount of injection molded parts that may be produced by the molding machine of FIG. 1.

Figure 6:
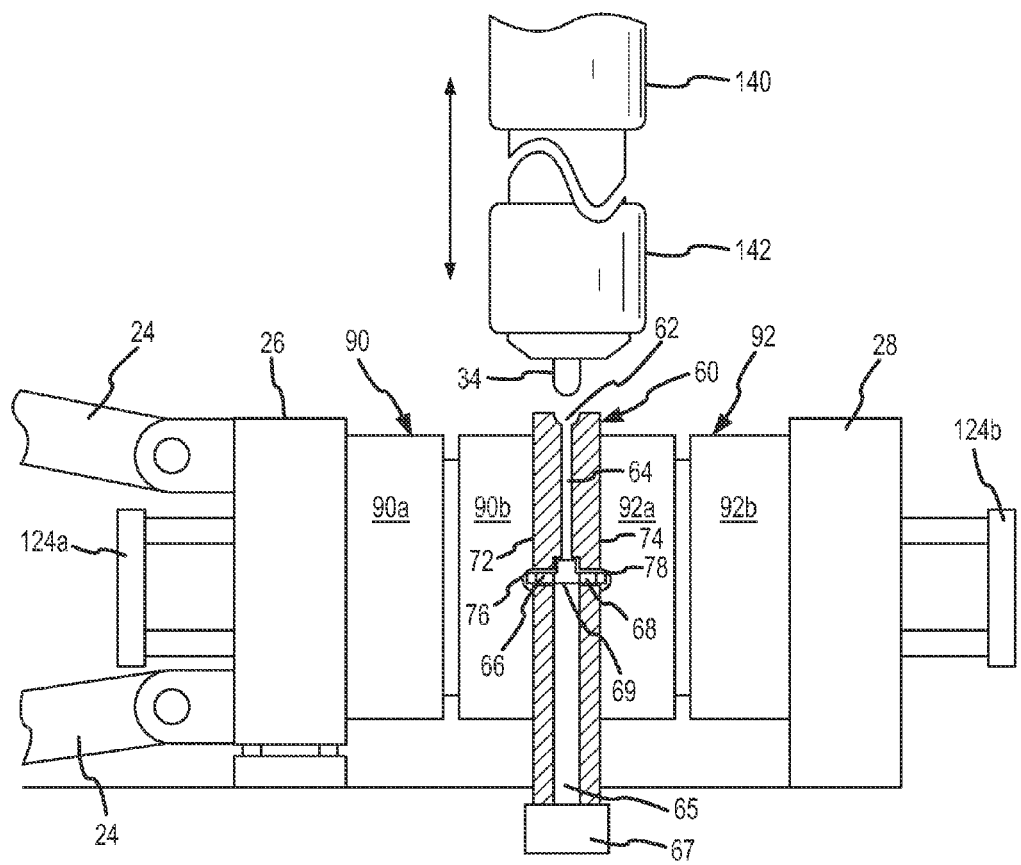
FIG. 6 illustrates a center platen that is operative to distribute injection material to first and second mold mounting surfaces.

FIG. 6 illustrates a cross-sectional view of the center platen 60 as disposed between the first and second platens 26, 28. As illustrated, the center platen 60 of FIG. 6 corresponds to the movable center platen 60 of FIGS. 3 and 4. However, it will be appreciated that many or all of the features discussed in relation to the movable center platen 60 are also applicable to the stationary center platen 60 of FIG. 5. As shown, a first set of mold halves 90*a*, 90*b* are disposed between the first platen 26 and the center platen 60 and a second set of mold halves 92*a*, 92*b* are disposed between the second platen 28 and the center platen 60. Upon opening the molds 90 and 92, ejectors 124*a*, 124*b* may be utilized to eject parts from cavities of the molds.

The center platen 60 includes an inlet 62 that is adapted to receive melt from the nozzle 142 of the vertical injection unit 140. The inlet 62 is connected to an internal passageway 64, which may be heated. The internal passageway 64 is fluidly interconnected with first and second mold passageways 66 and 68, which may likewise be heated. These mold passageways 66, 68 are operative to provide injection material to the first and second mould mounting surface 72, 74 and hence the first and second molds 90, 92.

In addition, each mold passageway 66, 68 includes a valve or gate 76, 78, respectively, that is operative to selectively allow flow through the passageway 66, 68. In this regard, it will be noted that selective actuation of the gates 76, 78 allow for various different operation of the molding machines 50, 70. For instance, both gates 76, 78 may be opened during an injection of a shot of injection material. In this regard, both molds 90, 92 may be filled simultaneously. Alternatively, one gate 76 or 78 may be closed to allow single mold operation.

In other arrangement, the gates 76, 78 may be operated sequentially. In such arrangement, the valve gate 76 may be closed and the second gate 78 may be opened. Accordingly, a shot of injection material may be individually provided to the second mold 92. Likewise, the second gate 78 may be closed in the first gate 76 may be opened and a shot of injection material may be provided to the first mold 90. In such arrangement, the molds may produce identical parts, or, the molds may produce different parts. In the present embodiment, the gates 76, 78 are part of a three-way valve 69 that may be actuated by an actuator 65, which is driven by a motor 67.

In a further arrangement, the molding machines 50, 70 may be utilized with a single mold. In such an arrangement, one of the valve gates 76 or 78 may be closed and/or a dummy mold may be disposed between the center platen 60 and one of the opposing platens. Further, it will be appreciated that the molding machines 50, 70 may also be utilized with stack molds. In such an arrangement, first and second stack molds may be disposed between each set of platens. Accordingly, the molding machines 50, 70 may be operative to generate four multiples of parts per cycle. In another arrangement, multiple center platens 60 may be utilized. Such arrangement may utilize multiple injection units interconnectable to the intermediate platens.

The foregoing description has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. It is intended that the appended claims be construed to include alternative embodiments to the extent permitted by the prior art.

What is claimed:

1. An injection molding apparatus, comprising:
    a stationary platen having a mold mounting surface;
    a first movable platen having a mold mounting surface;
    a second movable platen disposed between said first movable platen and said stationary platen, wherein said first and second movable platens are movable along a horizontal reference axis between an open position and a closed position relative to said stationary platen, said second movable platen including:
    first and second opposing mold mounting surfaces; and
    an internal passageway disposed between said first and second opposing mold mounting surfaces said internal passageway being adapted to receive material and provide said material to said first and second opposing mold mounting surfaces;
    a vertical injection unit disposed vertically above said movable platens and having a nozzle operative to move vertically between an extended position to engage said internal passageway when said second platen is in said closed position and a retracted position to disengage from said internal passageway to permit said second platen to move to said open position, wherein the entirety of said vertical injection unit is selectively moveable in a horizontal direction substantially parallel to the horizontal reference axis to selectively adjust a distance between said vertical injection unit and said stationary platen that is fixed during operation of the molding apparatus, wherein, upon being fixed at said distance, the nozzle aligns with the internal passageway in the second movable platen when the second movable platen is in the closed position, wherein movement of the first and second platens between the open and closed positions occurs free of horizontal movement of the vertical injection unit.

2. The apparatus of claim 1, further comprising:
    a clamp, wherein said clamp is operative to compress said first and second movable platens against said stationary platen, wherein a first mold disposed between said first and second movable platen is closed and wherein a second mold disposed between said second movable platen and said stationary platen is closed.

3. The apparatus of claim 1, wherein said horizontal reference axis is substantially perpendicular to at least one of said first and second opposing mold mounting surfaces.

4. The apparatus of claim 1, wherein said injection unit is positioned above said second movable platen when said second movable platen is in the closed position.

5. The apparatus of claim 1, wherein a longitudinal axis of said vertical injection unit is substantially normal to a support surface that supports the injection molding apparatus.

6. The apparatus of claim 1, wherein said internal passageway comprises:
    a receiving passageway for receiving material from said nozzle;
    a first passageway fluidly connected to said receiving passageway and extending to said first mold mounting surface; and
    a second passageway fluidly connected to said receiving passageway and extending to said second mold mounting surface.

7. The apparatus of claim 6, wherein said first and second passageways further comprise first and second selectively controllable valves, respectively.

8. The apparatus of claim 1, further comprising:
    a first set of tie bars extending substantially parallel to the horizontal reference axis, wherein said first set of tie bars guide movement of said first and second movable platens relative to said stationary platen.

9. The apparatus of claim 8, further comprising:
    a second set of tie bars extending substantially parallel to the horizontal reference axis, wherein said second set of tie bars guide movement of said vertical injection unit, wherein said injection unit is selectively positionable along the length of said second set of tie bars.

* * * * *